Figure 1:
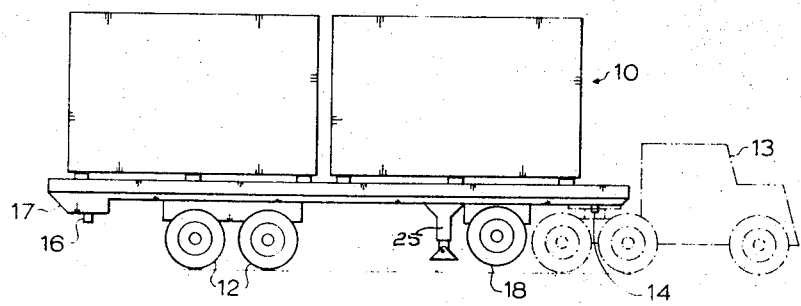

United States Patent [19]

McCarthy

[11] 3,837,673
[45] Sept. 24, 1974

[54] TRAILER BACKABLE TO LOADING DOCK FROM EITHER END

[75] Inventor: Robert Joseph McCarthy, Sutton W., Ontario, Canada

[73] Assignee: Robert A. Brown, Willowdale, Ontario, Canada

[22] Filed: June 4, 1973

[21] Appl. No.: 366,375

[30] Foreign Application Priority Data
June 23, 1972 Canada .................................. 145502

[52] U.S. Cl. .......... 280/415 B, 280/423 R, 280/408
[51] Int. Cl. ............................................. B62d 53/06
[58] Field of Search ............ 280/415 B, 423 R, 408

[56] References Cited
UNITED STATES PATENTS

| | | | |
|---|---|---|---|
| 2,186,593 | 1/1940 | Ronk ........................... | 280/415 B X |
| 2,986,408 | 5/1961 | Black .............................. | 280/423 R |
| 3,235,285 | 2/1966 | Tenenbaum .................. | 280/423 R |
| 3,237,967 | 3/1966 | Anderson ...................... | 280/423 R |
| 3,314,689 | 4/1967 | Hogan ......................... | 280/415 B X |
| 3,410,576 | 11/1968 | Turpen ......................... | 280/415 B X |

*Primary Examiner*—Leo Friaglia
*Attorney, Agent, or Firm*—Westell & Hanley

[57] ABSTRACT

An auxiliary fifth wheel connection for a trailer with auxiliary wheels allows backing of the trailer in either direction.

3 Claims, 6 Drawing Figures

TRAILER BACKABLE TO LOADING DOCK FROM EITHER END

This invention relates to an improved trailer of the type that is coupled to a tractor for highway truck transport.

This invention is an improvement upon those trailers which customarily carry large end opening containers, often called 'export-import containers' for pickup and delivery. Although the type of trailer with which the invention is concerned is dimensioned to carry two such containers arranged end-to-end, only one container is customarily carried on pick-up and delivery since no convenient method has heretofore been provided for bringing the front end of the front container into juxtaposition to a loading bay or dock.

Prior attempts have been made to provide a trailer which could be backed in either direction to a loading bay or dock. Such attempt involved the provision of a fifth wheel connection at each end and trailer wheels slidable longitudinally along the trailer body so that they can be positioned at the opposite end of the trailer from whichever end of the trailer is coupled to a tractor. Such arrangement is unduly expensive and inconvenient since the problem of providing wheel mountings which will withstand the rigors of long highway hauling but will permit sliding longitudinally on the trailer body, requires too great a cost, for its solution.

By 'normally forward' and 'normally rearward' end of a trailer is meant respectively the forward and rearward end of the trailer in normal, long distance highway hauling.

This invention provides a trailer which may be backed in either direction to a loading dock but which permits the use of standard fifth wheel members and main trailer wheels during highway travel.

The trailer most suitable for adaptation in accord with the invention is the conventional forty-five foot trailer capable of carrying one forty foot container for delivery or pickup or for two 20 foot containers arranged end-to-end. The improved trailer in accord with the invention has, in addition to the coupling and wheels used for long distance hauling, an auxiliary fifth wheel connection at what is the normal rearward end of the trailer (rearward of the rear wheels) and an auxiliary set of wheels adjacent the normally forward end designed and constructed to support the normally front end of the trailer when coupled to a tractor by the auxiliary fifth wheel coupling. The auxiliary wheels are mounted so that, when the trailer is coupled by its main fifth wheel connection, such as for normal highway travel the auxiliary wheels are out of contact with the ground, but the auxiliary wheels are also mounted so that they will support the normally forward end of the trailer with the normally rearward wheels clear of the ground when the trailer is connected to a tractor by the auxiliary fifth wheel coupling.

Preferably the auxiliary wheels are positioned to be out of contact with the ground in the normal coupling attitude and to maintain the normal trailer wheels out of contact with the ground in the auxiliary coupling attitude, through the proper fixed location of the auxiliary wheels. However, if desired, these results may be achieved through auxiliary wheels which are retractable and extendible.

It is seen that with the invention the trailer during normal highway travel uses the same equipment as before. The auxiliary wheels must be suitably mounted for loading yard travel but need not be designed for long range travel.

Figure 2:
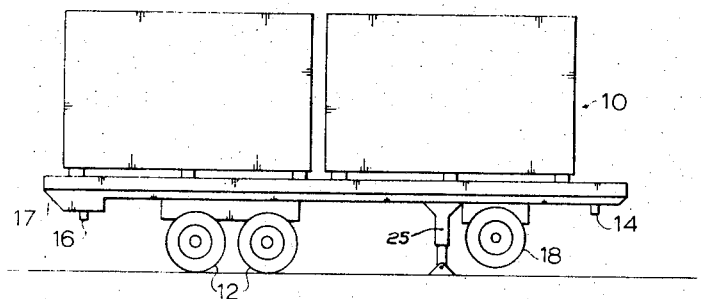
Figure 3:
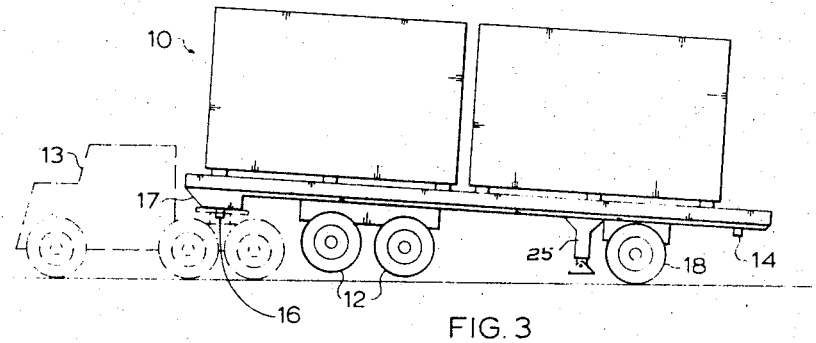

In the drawings which illustrate a preferred embodiment of the invention:

FIG. 1 shows a trailer in accord with the invention coupled for normal highway travel, FIG. 2 shows the trailer of FIG. 1 supported by a dolly leg rather than the tractor, FIG. 3 shows a trailer in accord with the invention, with the tractor reversed relative to FIG. 1, and FIGS. 4, 5 and 6 show an alternative embodiment of the invention.

In the drawings, there is shown a trailer 10 rearwardly supported on its normally rearward wheels 12 and at its normally forward end coupled to a tractor 13 by the fifth wheel coupling, here embodied by the pin 14 which pin 14 is received in the bore for fifth wheel assembly on the tractor.

Figure 4:
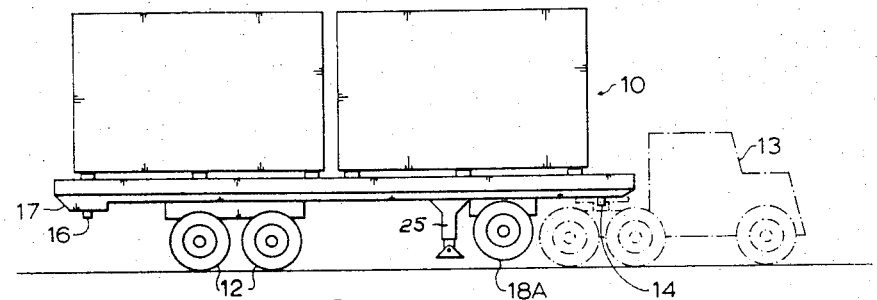
Figure 5:
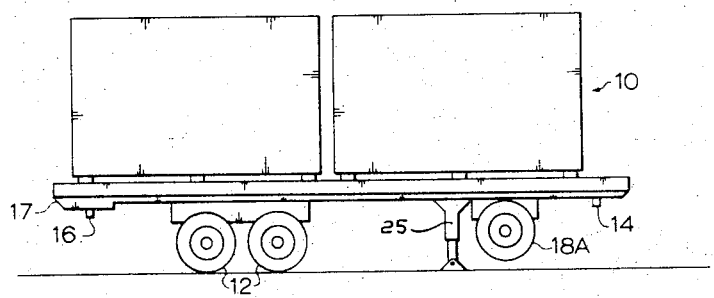

A retractable dolly-leg, customarily manually operated, is provided to assume the retracted position of FIGS. 1, 3, 4 and 6 when not in use and the extended position to support the trailer when not supported by the fifth wheel suspension, as shown in FIGS. 2 and 5. It is noted that an auxiliary fifth wheel pin 16 and mounting 17 are mounted near the normally rearward end of the trailer, rearward of the wheels 12. Near the normally forward end of the trailer, but rearward of the main fifth wheel coupling pin 14, there is provided a pair of auxiliary wheels 18, preferably positioned just in front of dolly legs 25. These are fixed in the position shown, the position being selected so that with the normal highway fifth wheel coupling (FIG. 1) or being supported by the dolly leg (FIG. 2); the auxiliary wheels 18 are clear of the ground but that when (FIG. 3) the trailer is coupled by its auxiliary coupling 17, 16 to the tractor fifth wheel, the trailer is supported by the auxiliary set of wheels 18 and by the auxiliary coupling, so that the normal wheels 12 are clear of the ground.

Thus, as shown in FIGS. 1, 2 and 3, the auxiliary wheels 18 are fixed in a position to allow the selective interchange of the main wheels 18 and the auxiliary wheels 12 in supporting the vehicle. This correct positioning of the main and auxiliary wheels relative to each other is also achieved through the correct positioning of the auxiliary fifth wheel mount 17 and pin 16.

Figure 6:
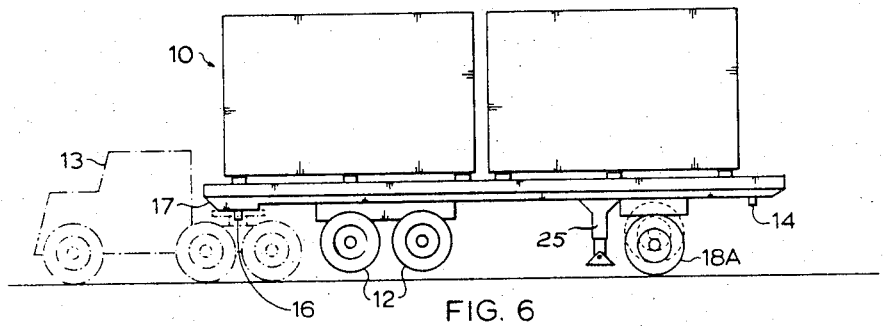

FIGS. 4-6 show alternative means for mounting the auxiliary wheels so that the correct attitude is achieved. Here the auxiliary wheels 18A are retractably mounted and controlled by means (not shown but well known to those skilled in the art and preferably pneumatically operated) to move to a retracted position (FIGS. 4 and 5) when the main wheels and fifth wheel coupling are to be used, and to move to an extended position (FIG. 6) when the auxiliary coupling and the auxiliary wheels are to be used.

In operation, the tractor-trailer combination shown in FIG. 1 after being used for highway travel may be backed up to a loading bay or dock and the contents of the rear container unloaded rearwardly. If it is then desired to unload the normally forward container, the normally forward end of the trailer 10 is supported and raised by the extension of dolly legs 25 so that the tractor 13 may be driven clear of the trailer. With the tractor clear of the trailer, the tractor is recoupled to the opposite end with the dolly legs still extended. Tests have shown that the extended dolly legs will withstand the fore and aft forces caused by coupling the tractor at their normally forward end. The legs 25 are then retracted so that the forward end of the trailer rests on auxiliary wheels 18 (FIG. 2). The tractor is then driven around, and coupled to the auxiliary fifth wheel coupling 16–17, again in a manner well known to those skilled in the art, and supports at the normal forward end being withdrawn in accord with known practices so that the trailer is supported on the auxiliary coupling 16–17 and the auxiliary wheels 18 (as shown in FIG. 3). The coupled tractor trailer may then be backed around so that the normally front (now rear) end may approach a loading bay. When it is desired to use the truck again for highway travel, the procedure is reversed and the tractor again coupled as shown in FIG. 1.

The procedure is similar using the embodiment of FIGS. 4 to 6.

In operation, the tractor-trailer combination shown in FIG. 4 after being used for highway travel, (the auxiliary wheels being retracted as shown), may be backed up to a loading bay or dock and the contents of the rear container unloaded rearwardly. If it is then desired to unload the normally forward container, the normally forward end of the trailer 10 is supported and raised by apparatus (the extension of dolly legs 25) so that the tractor 13 may be driven clear of the trailer. With the tractor clear of the trailer, the legs 25 are then retracted and the wheels 18A extended so that the forward end of the trailer rests on auxiliary wheels 18 (FIG. 5). The tractor is then driven around, and coupled to the auxiliary fifth wheel coupling 16–17, again in a manner well known to those skilled in the art, any supports at the normal forward end being withdrawn in accord with well known practices so that the trailer is supported on the auxiliary coupling 16–17 and the auxiliary wheels 18 (as shown in FIG. 6). The coupled tractor trailer may then be backed around so that the normally front (now rear) end may approach a loading, bay. When it is desired to use the truck again for highway travel, the procedure is reversed and the tractor again coupled as shown in FIG. 4.

I claim:

1. A truck trailer for connection to a truck tractor by the latter's fifth wheel connection, said trailer being designed to support at least two containers thereon, arranged end to end, said trailer defining a normally front and a normally rear end, main coupling means on said normally forward end for coupling said trailer to such tractor fifth wheel connection, main wheels being mounted on said trailer adjacent said normally rear end for rollably supporting the trailer when so coupled, the improvement in combination with said truck trailer comprising:

an auxiliary coupling means on said trailer, rearwardly of the normally rear wheels, for coupling said trailer to such a tractor fifth wheel connection, auxiliary wheels mounted on said trailer adjacent said normally forward end designed and arranged to support said trailer, with said main wheels clear of the ground when said auxiliary coupling means is coupling said trailer to a tractor, said auxiliary wheels being designed and arranged to be clear of the ground when said main coupling means is coupling said trailer to a tractor.

2. A trailer as claimed in claim 1, wherein said auxiliary wheels so designed and arranged are fixed in position.

3. A truck trailer designed to be hauled by a truck tractor when coupled thereto by a fifth wheel connection, said trailer being designed to support at least two containers arranged end to end, said trailer defining a normally forward and a normally rearward end, main coupling means on said normally forward end for coupling said trailer to such tractor fifth wheel connection, main wheels mounted on said trailer adjacent said normally rearward end for rollably supporting the trailer when coupled by said main coupling means, the improvement in combination with said truck trailer comprising:

an auxiliary coupling means for coupling said trailer to such tractor fifth wheel connection mounted on said trailer rearwardly of the normally rear wheels, auxiliary wheels mounted on said trailer adjacent said normally forward end designed to move between an extended and a retracted position; said auxiliary wheels, in said extended position being arranged when said trailer is coupled to a tractor by said auxiliary coupling means to support said trailer with said main wheels clear of the ground and said auxiliary wheels are designed, in said retracted position to be clear of the ground when said main coupling means is coupling said trailer to a tractor.

* * * * *